United States Patent
Guender et al.

(10) Patent No.: US 11,204,121 B2
(45) Date of Patent: Dec. 21, 2021

(54) HYDRAULIC SYSTEM

(71) Applicant: Robert Bosch GmbH, Stuttgart (DE)

(72) Inventors: Andreas Guender, Ramsthal (DE); Jan Lukas Bierod, Bad Camberg (DE); Marco Scholz, Burgsinn (DE); Ralf Maier, Neuendorf (DE); Rene Huettl, Chemnitz (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 16/415,533

(22) Filed: May 17, 2019

(65) Prior Publication Data

US 2019/0353289 A1 Nov. 21, 2019

(30) Foreign Application Priority Data

May 18, 2018 (DE) ...................... 10 2018 207 912.9
May 22, 2018 (DE) ...................... 10 2018 208 004.6

(51) Int. Cl.
| | |
|---|---|
| *F16L 39/02* | (2006.01) |
| *F16L 33/207* | (2006.01) |
| *F16L 33/28* | (2006.01) |
| *F16L 37/56* | (2006.01) |

(52) U.S. Cl.
CPC ............ *F16L 39/02* (2013.01); *F16L 33/2071* (2013.01); *F16L 33/28* (2013.01); *F16L 37/56* (2013.01)

(58) Field of Classification Search
CPC ....... F16L 33/28; F16L 33/2071; F16L 33/24; F16L 41/03; F15B 21/00; F15B 13/00
USPC ........................................... 285/124.1–124.5
See application file for complete search history.

(56) References Cited

U.S. PATENT DOCUMENTS

| | | | | | |
|---|---|---|---|---|---|
| 2,649,742 | A | * | 8/1953 | Armstrong | ................ F04F 5/46 417/151 |
| 2,768,843 | A | * | 10/1956 | Zeilman | .................. F16L 39/06 285/124.1 |
| 2,983,506 | A | * | 5/1961 | Bertsch | ................ B60G 17/033 267/64.11 |
| 3,093,397 | A | * | 6/1963 | Yancey | ................... F16L 39/00 285/124.1 |
| 3,825,287 | A | * | 7/1974 | Erickson | ................. F16L 17/02 285/124.3 |

(Continued)

FOREIGN PATENT DOCUMENTS

GB 424406 A * 2/1935 .............. F16L 39/00

*Primary Examiner* — James M Hewitt, II
(74) *Attorney, Agent, or Firm* — Maginot, Moore & Beck LLP

(57) ABSTRACT

A hydraulic system has a fluid path which connects two system components fluidically to one another and which comprises a hydraulic hose. It is known to form a fluid path between two components of a hydraulic system, for example between a pump and a control block, by a single hydraulic hose which is designed in accordance with the maximum volume flow and the maximum pressure. A hydraulic hose for large volume flows and high pressures is disproportionately expensive relative to a hydraulic hose for smaller volume flows and, on account of its larger internal and external diameters, has a larger minimum bending radius than a hydraulic hose for smaller volume flows. In order to provide a cost-effective and compact structure, a hydraulic system according to the disclosure has the fluid path formed by at least two hydraulic hoses arranged fluidically parallel to one another.

9 Claims, 2 Drawing Sheets

(56) References Cited

U.S. PATENT DOCUMENTS

| | | | | |
|---|---|---|---|---|
| 5,363,907 A | * | 11/1994 | Dunning | B05C 5/001 |
| | | | | 137/340 |
| 2005/0211802 A1 | * | 9/2005 | Newton | A01C 23/04 |
| | | | | 239/548 |
| 2009/0064666 A1 | * | 3/2009 | Behrendt | F01N 3/2066 |
| | | | | 60/286 |
| 2014/0367960 A1 | * | 12/2014 | Uenishi | F16L 41/03 |
| | | | | 285/179 |

* cited by examiner

HYDRAULIC SYSTEM

This application claims priority under 35 U.S.C. § 119 to patent application number DE 10 2018 207 912.9, filed on May 18, 2018 in Germany, and to patent application number DE 10 2018 208 004.6, filed on May 22, 2018 in Germany, the disclosures of which are incorporated herein by reference in their entireties.

BACKGROUND

The disclosure relates to a hydraulic system having a fluid path which connects two system components fluidically to one another and which comprises a hydraulic hose.

It is known to form a fluid path between two components of a hydraulic system, for example between a pump and a control block, by means of a single hose line which is designed in accordance with the maximum volume flow and the maximum pressure. The hose lines installed vary, depending on application, between small throughflow cross sections with a small wall thickness and large throughflow cross sections with correspondingly greater wall thicknesses. A hose line for large volume flows and high pressures is disproportionately expensive in relation to a hose line for smaller volume flows and equal pressures and, on account of its larger internal and external diameters, has a larger minimum bending radius than a hose line for small volume flows.

The larger the throughflow cross section of a hose line, the larger is the inner surface area which is subjected to the pressure to which the liquid flowing through the hose line is exposed. The force acting on the inner wall increases as the throughflow cross section increases. In order that the wall of the hose line withstands this force, it is necessary for the wall thickness to increase, or for the reinforcement to become more resistant, as the throughflow cross section increases. Alongside the additional weight which results from more material being used, hose lines with a large throughflow cross section also have a greater level of rigidity and larger bending radii. The level of material stressing is more pronounced in hose lines with a large throughflow cross section since the forces acting from the inside subject the material to pronounced loading. Increased material wear is the result.

The large amounts of material being used, the great wall thicknesses and the associated manufacturing outlay mean that hydraulic hoses with a large throughflow cross section are considerably more expensive to manufacture than those with a small throughflow cross section.

SUMMARY

The object on which the disclosure is based is that of a hydraulic system having a fluid path which connects two system components fluidically to one another and which comprises a hydraulic hose being formed such that, on the one hand, the desired volume flows can flow between the two system components without any notable pressure loss and, on the other hand, a compact construction and cost-effective production are possible.

This object is achieved by a hydraulic system in which the fluid path which connects the two system components fluidically to one another is formed by at least two hose lines arranged fluidically parallel to one another. In the case of a hydraulic system according to the disclosure, therefore, the volume flow flowing between two system components is divided up into a number of volume sub-flows which corresponds to the number of hose lines arranged parallel to one another. The throughflow cross section, and thus the inner surface area of said hose lines, can therefore be smaller than the throughflow cross section of a single hose line which has the entire volume flow flowing through it.

The small inner surface area means that pressure-induced mechanical impacts on the system components and the elements carrying them, the level of stressing of the material and the amount of material wear are reduced in relation to using a single hose line with a large throughflow cross section. Furthermore, the hose lines arranged fluidically parallel to one another can be selected such that their amplitudes and/or frequencies overlap and therefore cancel each other out.

On account of the smaller minimum bending radii of the hose lines, a hydraulic system according to the disclosure can be of compact construction. Installation and handling are facilitated since the hose lines have a low level of rigidity and a high level of flexibility and, on account of the small wall thickness, are relatively lightweight. Cost-related advantages are achieved by the number of commonly used parts increasing since, rather than a certain size of hose having to be provided for each volume flow, the arrangement is freely scalable. Also, on account of being more straightforward to manufacture, and requiring less material, in relation to hoses of larger throughflow cross section, hoses with a small throughflow cross section together are easier to procure than a hose with a large throughflow cross section. This has a marked effect on the lifecycle costs, in particular, on account of the regular hose-changeover cycles required.

Dividing up a fluid path into a plurality of hose lines arranged parallel to one another is advantageous, in particular, in the high-pressure region of a hydraulic system, for example between the delivery side of a pump and a control block.

It is advantageous if two hose lines are arranged fluidically parallel to one another have the same throughflow cross section. In particular, when more than two hose lines are arranged fluidically parallel to one another are present, the throughflow cross section for all the hose lines arranged fluidically parallel to one another is the same. Therefore, the hose lines used, at least in respect of the throughflow cross section and the thickness and construction of the hose wall, are commonly used parts and are thus cost-effective to procure. Different maximum volume flows in different hydraulic systems can be covered by the selected number of identical hose lines with a small throughflow cross section. For example, instead of a one-inch hose line as has been the case hitherto, use is made of two half-inch hose lines or, instead of a one and a half-inch hose line as has been the case hitherto, use is made of three half-inch hose lines.

One of the hose lines arranged fluidically parallel to one another can have a first length and another can have a second length. The different lengths are coordinated with one another here such that pressure pulsations generated by a pump and pressure pulsations which overlap in respect of an amplitude and phase position at the location where the fluid sub-paths come together, cancel each other out. Such a design of the hose-line lengths advantageous in particular for pumps—be these fixed-displacement pumps or variable-displacement pumps—which are driven at a largely constant speed. This is because there is then a reduction, or even total elimination, of the pressure pulsation for the entire volume-flow and pressure range. The one line here is longer than the other line by half a wavelength of the pulsation which is to be dumped. If the pump is driven at different speeds for example by an electric motor which can have its speed regulated or controlled, then there can also be a typical system-operating point here or an operating point at which, for certain components of the system, resonances are generated. Such an operating point can be established for the respective installation, for example beforehand, prior to it being used as intended. It is then possible for the difference in length of the lines to be selected such that the pressure pulsation is damped or cancelled out at the operating point.

For reasons relating to cost, it can be advantageous to use, within a hydraulic system according to the disclosure, a hydraulic component with just one high-pressure connection, for example a pump with just one high-pressure connection, as is otherwise used in large numbers. In this case, an adapter is present, and this adapter has a first connection, on which a first hose line of the at least two hose lines arranged fluidically parallel to one another is fastened, and a second connection, on which a second hose line of the at least two hose lines arranged fluidically parallel to one another is fastened, and a third connection, which is connected to a connection of a system component, and wherein the first connection, the second connection and the third connection of the adapter are connected to one another via channels within the adapter.

The adapter can comprise an SAE flange for at least one of its connections, and it can therefore be connected, via said connection, to a system component, for example a pump, having an SAE flange pattern.

The adapter is preferably an adapter block. The first connection and the second connection are advantageously located in the same connection surface of the adapter block.

If, in any case, a system component is designed and used anew for the hydraulic system according to the disclosure, it can be advantageous if the system component has a first connection, on which a first hose line of the at least two hose lines arranged fluidically parallel to one another is fastened, and a second connection, on which a second hose line of the at least two hose lines arranged fluidically parallel to one another is fastened.

BRIEF DESCRIPTION OF THE DRAWINGS

The basic design of a hydraulic fluid path between two components of a hydraulic system according to the disclosure and also an adapter for different numbers of hose lines arranged fluidically parallel to one another are illustrated in the drawing. The disclosure will now be explained in more detail with reference to the figures of said drawing, in which.

DETAILED DESCRIPTION

Figure 1:
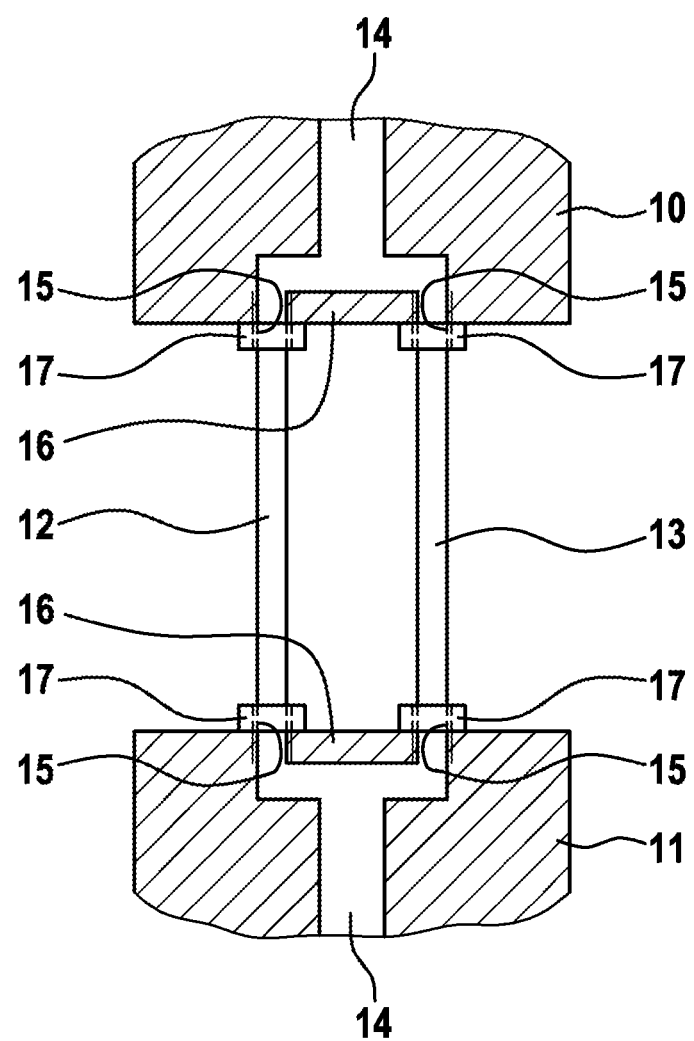
FIG. 1 shows a basic arrangement of two hose lines arranged fluidically parallel to one another between two components of a hydraulic system.

According to FIG. 1, a hydraulic system comprises a first system component 10 and a second system component 11. The two system components are connected to one another by two hose lines 12 and 13 arranged fluidically parallel to one another. This means that a fluid stream which flows from the one system component to the other system component is divided up into two sub-streams, wherein the one sub-stream flows through the hose line 12, and the other sub-stream flows through the hose line 13, from the one system component to the other system component. The two hose lines 12 and 13 are of equal length and have the same throughflow cross section. The sum of the two throughflow cross sections is equal to the throughflow cross section of a single hose line designed for the throughflow of the maximum volume flow.

The two hose lines 12 and 13 are each connected directly to the system components 10 and 11. For this purpose, an internal channel 14 in a system component 10 or 11 divided up into two branches, which open out, in the form of threaded connections 15, in a connection surface 16 of each system component 10, 11. At their ends, the hose lines 12 and 13 bear threaded fittings 17, which are screwed into the threaded connections 15.

Figure 2:
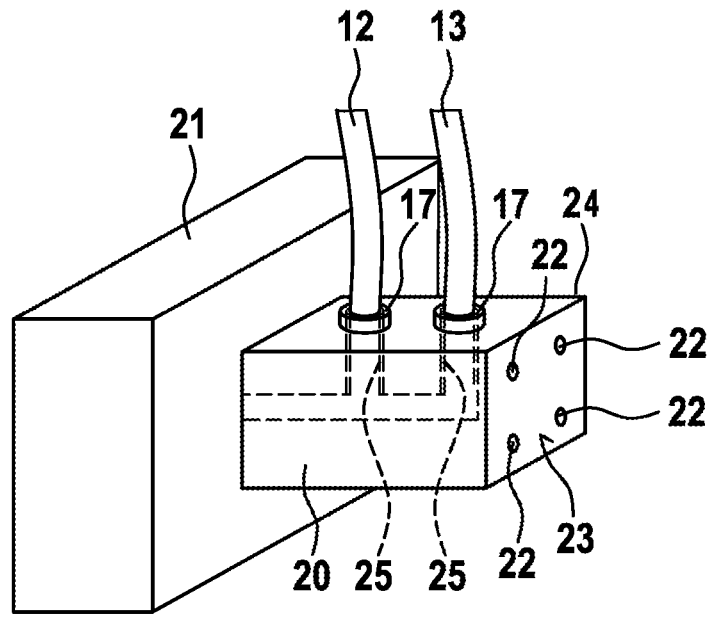
FIG. 2 shows an adapter by means of which two hose lines arranged fluidically parallel to one another are attached to a system component.
Figure 3:
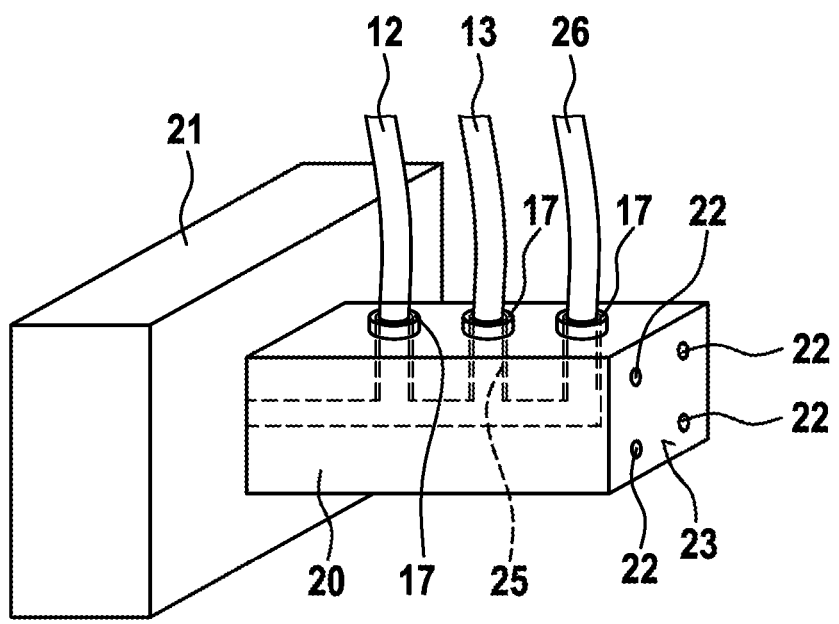
FIG. 3 shows an adapter by means of which three hose lines arranged fluidically parallel to one another are attached to a system component.

In the embodiment according to FIGS. 2 and 3, hose lines, rather than being connected directly, are connected to a system component 21 via an adapter 20. Said system component has just a single connection (not specifically evident in the figures) for the fluidically parallel hose lines leading to the system component 21. In accordance with an SAE connection surface, the connection has a central bore for the fluid flow and four threaded bores which are arranged in the corners of a rectangle and are all four spaced apart from the central bore by the same distance. The adapter 20 is positioned on the SAE connection surface of the system component 21, said adapter being designed in the form of an adapter block and, in a manner corresponding to the SAE connection surface of the system component 21, having, in its connection surface which rests on the SAE connection surface of the system component, an SAE flange pattern having likewise a central bore, a sealing ring, which encloses the bore, and four threaded bores. These threaded bores 22 pass through the adapter block 20 and can be seen in the screw-mounting surface 23, which is located opposite the SAE connection surface of the adapter block.

A connection surface 24 of the adapter block 20, said connection surface extending between the SAE connection surface and the screw-mounting surface 23, contains a plurality of threaded connections 25, which open out into the central bore of the adapter block 20 and to which the hose lines are connected by way of threaded fittings 17.

In the embodiment according to FIG. 2, as in the exemplary embodiment according to FIG. 1, two hose lines 12 and 13 are connected to the system component 21 via the adapter 20. Said system component can be, for example, a pump with a high-pressure connection which has an SAE flange pattern.

In the embodiment according to FIG. 3, as in the exemplary embodiment according to FIG. 1, two hose lines 12 and 13 and a third hose line 26 are connected to the system component 21 via the adapter 20. There are therefore three hose lines arranged particularly parallel to one another present here, wherein the threaded connections are located in a row one behind the other and this row is oriented perpendicularly to the SAE connection surface of the system component.

In particular high-pressure regions of the system components are connected to one another by the hose lines arranged fluidically parallel to one another, since it is particularly advantageous to replace a thick high-pressure hose with a large throughflow cross section by a plurality of thinner high-pressure hoses with smaller throughflow cross sections, which add up to equal the large throughflow cross section.

LIST OF REFERENCE SIGNS 10 first system component
11 second system component 12 hose line
13 hose line
14 internal channel in 10 or 11
15 threaded connections in 10 and 11
16 connection surface on 10 or 11
17 threaded fittings
20 adapter
21 system component
22 threaded bores
23 screw-mounting surface
24 connection surface of 20
25 threaded connections on 20
26 hose line

What is claimed is:

1. A hydraulic system, comprising: a first hydraulic system component having a hydraulic fluid outlet; a second hydraulic system component having a hydraulic fluid inlet; and a fluid path which connects the hydraulic fluid outlet and the hydraulic fluid inlet fluidically to one another, the fluid path comprising: a first hose line extending between the hydraulic fluid outlet and the hydraulic fluid inlet; and a second hose line extending between the hydraulic fluid outlet and the hydraulic fluid inlet such that the fluid path is formed by the first and the second hose lines arranged fluidically parallel to one another such that a fluid stream which flows from the first hydraulic system component to the second hydraulic system component is divided in or at the first hydraulic system component into a first sub-stream in the first hose line and a second sub-stream in the second hose line, and the first sub-stream and the second sub-stream are recombined in or at the second hydraulic system component; the fluid path further comprising: an adapter, having: a first connection, on which the first hose line is fastened; a second connection, on which the second hose line is fastened; and a third connection, which is connected to a connection of the second hydraulic system component, wherein the first connection, the second connection, and the third connection of the adapter are connected to one another via channels within the adapter.

2. The hydraulic system according to claim 1, wherein: a throughflow cross section of the first hose line is identical to a throughflow cross section of the second hose line.

3. The hydraulic system according to claim 2, the fluid path further comprising: a third hose line extending between the hydraulic fluid outlet and the hydraulic fluid inlet, wherein the throughflow cross section for the third hose line is the same as the throughflow cross section for the first hose line.

4. The hydraulic system according to claim 1, wherein the first hose line and the second hose line are of different lengths.

5. The hydraulic system according to claim 1, wherein the adapter comprises an SAE flange for at least one of its connections.

6. The hydraulic system according to claim 1, wherein: the adapter is an adapter block, and the first connection and the second connection are located in the same connection surface of the adapter.

7. The hydraulic system according to claim 1, wherein: the first hydraulic system component has a first connection, on which the first hose line is fastened; and the first hydraulic component has a second connection, on which the second hose line is fastened.

8. The hydraulic system according to claim 4, wherein: the first hose line has first length; the second hose line has a second length; and the first and second lengths are selected so as to differ in length based upon a pressure pulsation associated with a pump.

9. The hydraulic system of claim 8, wherein the first and second lengths are selected so as to differ in length by half a wavelength of the pressure pulsation.

* * * * *